(12) United States Patent
Robinson et al.

(10) Patent No.: US 8,146,812 B2
(45) Date of Patent: Apr. 3, 2012

(54) IMAGING METHOD AND SYSTEM FOR TRACKING DEVICES

(75) Inventors: Ian Robinson, Pebble Beach, CA (US); Geoff Lyon, Menlo Park, CA (US); Alan McReynolds, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1444 days.

(21) Appl. No.: 11/265,364

(22) Filed: Nov. 1, 2005

(65) Prior Publication Data
US 2007/0095907 A1   May 3, 2007

(51) Int. Cl.
*G06F 19/00* (2006.01)
*G06Q 30/00* (2006.01)
*G06Q 90/00* (2006.01)

(52) U.S. Cl. ......... 235/385; 235/375; 235/383; 235/451

(58) Field of Classification Search .................. 235/383, 235/385, 375, 451
See application file for complete search history.

(56) References Cited

U.S. PATENT DOCUMENTS

| | | | | |
|---|---|---|---|---|
| 5,323,327 | A * | 6/1994 | Carmichael et al. | 700/215 |
| 5,455,410 | A * | 10/1995 | Schneider | 235/385 |
| 5,512,739 | A * | 4/1996 | Chandler et al. | 235/462.09 |
| 6,246,642 | B1 * | 6/2001 | Gardner et al. | 369/30.42 |
| 6,371,375 | B1 * | 4/2002 | Ackley et al. | 235/462.45 |
| 6,598,789 | B1 * | 7/2003 | Matsumoto et al. | 235/383 |
| 7,066,388 | B2 * | 6/2006 | He | 235/383 |
| 2005/0067490 | A1 * | 3/2005 | Fletcher | 235/383 |
| 2005/0230478 | A1 * | 10/2005 | Chapman et al. | 235/462.13 |

* cited by examiner

*Primary Examiner* — Ali Sharifzada (57) ABSTRACT

A method and system of tracking devices uses imaging and optionally tags. Tracking is performed when the identification information associated with the devices are initially received and exposed towards a scanning bar in an enclosure. This scanning bar scans at one or more predetermined intervals the one or more devices in the enclosure of hardware. The system for tracking devices includes an enclosure capable of receiving one or more devices positioned to expose identification information related to each device and a scanning bar movably coupled to the enclosure that passes over each of the one or more devices and captures images of the identification information exposed by each of the one or more devices.

20 Claims, 6 Drawing Sheets

IMAGING METHOD AND SYSTEM FOR TRACKING DEVICES

BACKGROUND

It has become increasingly difficult to track computing equipment and other devices in datacenters and other locales. Each device is typically installed in an enclosure and many enclosures occupy a floor or multiple floors in the typical large datacenter. Monitoring the devices in each enclosure is possible but physically locating the devices can be challenging. Even if the devices are installed in a datacenter according to a map or other layout, it is likely that this layout will change over time as systems grow, devices are replaced and reconfigurations of the systems are made.

Quickly identifying the devices becomes a more complex task than previously due to volume of devices and computers in a location. With racks and racks of equipment in a computer room, it may be necessary to scan the devices in each rack manually to identify a particular device. This may not only be time consuming but futile in the event a person is searching for a device that unbeknownst to him or her has been previously moved from one location to another.

Efforts have been made to create devices with RFID tags built into the device to improve or automate locating a device. Unfortunately, this requires that every device has an RFID tag and the tag is compatible with the tag reader being used for all of the other tagged devices in an enclosure or location. Further, it also requires that the tag on the device operate correctly otherwise a malfunctioning tag or reader may make it appear that a device has disappeared or at least is not in the expected location. Those legacy devices missing an RFID tag need an alternate solution to accurately track the devices and provide a robust asset tracking capability.

BRIEF DESCRIPTION OF THE DRAWINGS

Like reference numbers and designations in the various drawings indicate like elements.

SUMMARY

One aspect of the present invention features a method and system of tracking the location of various devices. The identification information associated with the devices are initially received and exposed towards a scanning bar in an enclosure. This scanning bar scans at one or more predetermined intervals the one or more devices in the enclosure of hardware.

Another aspect of the present invention includes a system for tracking devices. The system includes an enclosure capable of receiving one or more devices positioned to expose identification information related to each device and a scanning bar movably coupled to the enclosure that passes over each of the one or more devices and captures images of the identification information exposed by each of the one or more devices.

DETAILED DESCRIPTION

Implementations of the present invention are used for tracking devices mounted in racks or other types of enclosures. These devices typically include computers, electronics and other devices that need to be remotely monitored. However aspects of the present invention could be applied to any device whose location needs to be determined and monitored remotely. Each device is positioned in an enclosure with a scanning bar that passes over the devices to take an image. The image can capture any combination of identifying information for the device including bar codes, serial numbers, model numbers, proprietary markings, light patterns emitted from lights and even data displayed on a small display. Image processing routines then clean up the images to either increase the visual acuity of these various features when displayed or potentially individually identify the device. For example, a bar code or other identifier of a device can be processed to identify a device with a factory assigned identifier. Once the devices are identified, an overall view of the devices and their location is obtained by cross-referencing the various images with the location in each enclosure.

While there are many advantages to the present invention, a few of these advantages have been included herein. Tracking devices in accordance with implementations of the present invention makes locating devices relatively quick and easy. To ensure the data is up-to-date, the system takes new images of each device at predetermined time intervals and when any device is relocated to another enclosure. Consequently, the location of the device is known in advance of inventory, repair, servicing or other events.

Aspects of the present invention can work with legacy devices and, in most instances, do not require reengineering or retrofitting. Other identification and inventory control methods can also be used and are not supplanted by implementations of the present invention. For example, an identification system using RFID (radio frequency identification) can be used as either a primary, backup or corroboration system with respect to the imaging data and results gathered by implementations of the present invention. Various other identification approaches can be used with aspects of the present invention to provide improved identification and location awareness of the devices.

Figure 1:
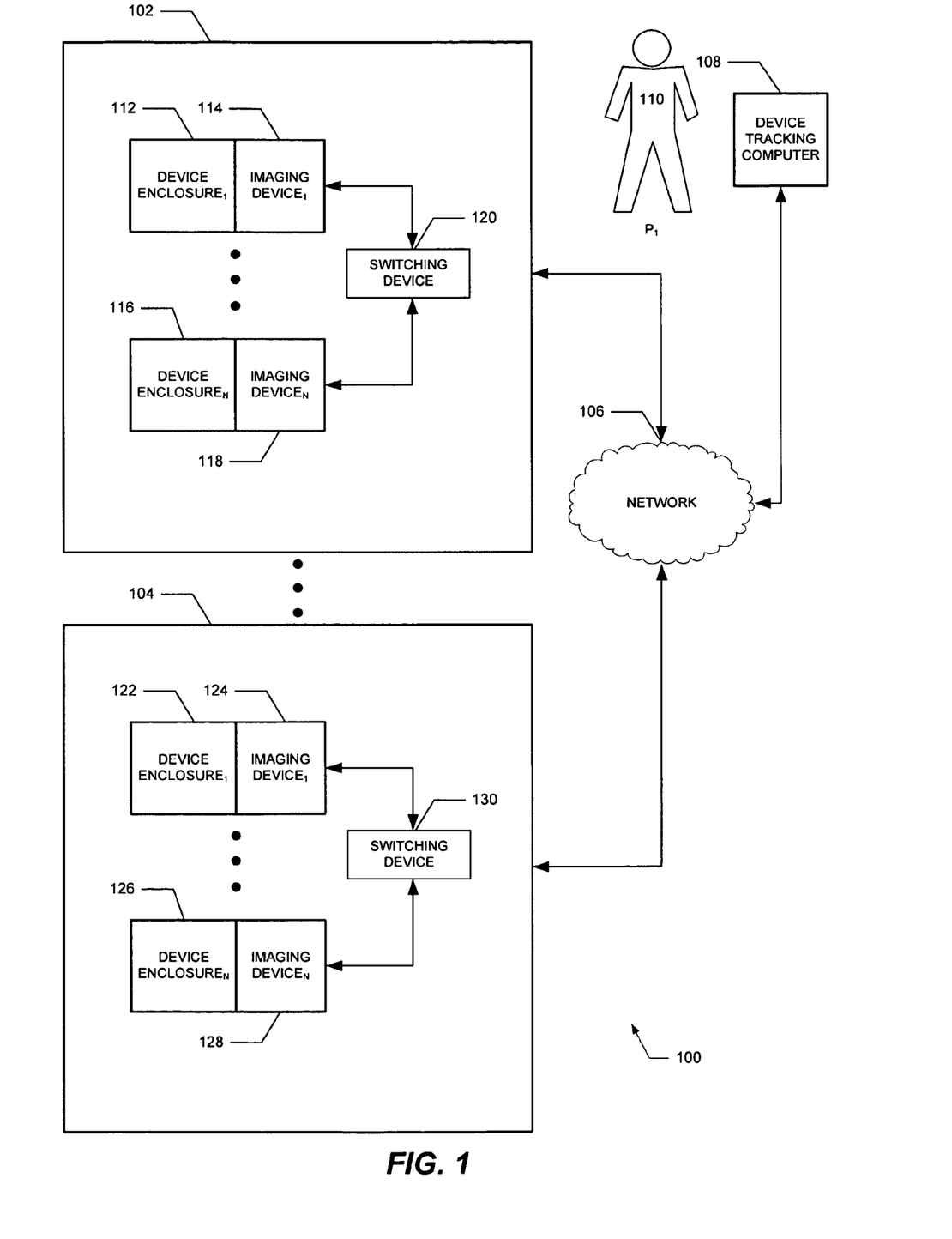
FIG. 1 is a schematic diagram of a system for tracking devices stored in one or more enclosures located in various different locations and in accordance with one implementation of the present invention.

FIG. 1 is a schematic diagram of a system 100 for tracking devices stored in one or more enclosures located in various different locations. An arbitrary set of locations 102 through 104 may be in different buildings, campuses, rooms or other physical geography and contain one or more different devices situated in one or more enclosures. Each of locations 102 through 104 is connected together over a network 106 and monitored through a device tracking computer 108. As needed, a person 110 may access device tracking computer 108 to identify the location of a device, troubleshoot a device, take inventory of the various devices or perform any other function that uses location and identification information of a device. Device tracking computer 108 can be a workstation, a laptop, a personal digital assistant (PDA) or a cell phone with computing capabilities. Network connections between device tracking computer 108, network 106 and devices in locations 102 through 104 can be wired or wireless using Wi-Fi, Wi-Max, cellular or any other communication technologies. Alternatively, devices in locations 102 through 104 can be directly connected to device tracking computer 108 using Firewire, USB, SCSI or other direct connection protocol/interface in the event device tracking computer 108 is located in the vicinity of these devices rather than located remotely over network 106.

In location 102 as depicted, one implementation includes device enclosure$_1$ 112 through device enclosure$_N$ 116 each having corresponding imaging device$_1$ 114 through imaging device$_N$ 118 to hold various devices and obtain their images respectively. For example, these enclosures can be one type of enclosure 19 inches in width and various heights to hold computer servers, storage devices and various computer related communication equipment typically found in large datacenters. A switching device 120 associated with location 102 connects the one or more enclosures and imaging devices to network 106 to transport images and other related information. For example, switching device 120 can be a relatively unintelligent hub that shares packets with each of the imaging devices or a more or complex network device that performs sophisticated packet processing operations. In either situation, processing associated with implementations of the present invention can be performed using software executed on a computing device co-located in one of device enclosure$_1$ 112 through device enclosure$_N$ 116 or remotely on device tracking computer 108.

Similarly, each of the other locations up to and including location 104 include a similar set of components and processing capabilities. As illustrated, location 104 also includes device enclosure$_1$ 122 through device enclosure$_N$ 126 each having corresponding imaging device$_1$ 124 through imaging device$_N$ 128 to gather their images. A separate switching device 130 in location 104 also connects the one or more enclosures and imaging devices to network 106 for the transport of images, analysis and other data related to implementations of the present invention. It should be appreciated that the value "N" is an arbitrary and independent value in each of the different locations 102 through 104. Accordingly, the number of enclosures, devices and imaging devices used depends on the needs in each location as the value "N" may be different in each of location 102 through 104; Further, a single switching device is illustrated for each of location 102 through 104 for convenience however multiple switching devices in conjunction with one or more communication devices, modems and other communication equipment can also be used as needed in the various locations.

In operation, devices already installed at location 102 may be removed from one of device enclosure$_1$ 112 through device enclosure$_N$ 116. They may be moved to location 104 and then installed in one or more device enclosure$_1$ 122 through device enclosure$_N$ 126. At location 102 where the devices were removed, one or more of imaging device$_1$ 114 through imaging device$_N$ 118 scan over the various remaining devices in the enclosures and update the images to not include the recently removed devices. Subsequent image processing operations can be performed that further analyze the images and determine detailed information useful in inventory and other tracking operations to indicate the devices have been removed Next, one or more of imaging device$_1$ 124 through imaging device$_N$ 128 in location 104 scan the one or more device enclosure$_1$ 122 through device enclosure$_N$ 126 and detect that one or more devices have been installed or added. The images produced by one or more of imaging device$_1$ 124 through imaging device$_N$ 128 now include the added devices and through detailed image processing operations provide advanced inventory, tracking and troubleshooting operations in accordance with implementations of the present invention. For example, a person 110 is able to immediately determine that a failing device is no longer in location 102 but in location 104 when one of the devices moved from location 102 to location 104 begins to fail. Further, person 110 is able to remotely identify the specific location and particular rack and rack position of the device or devices in the one or more of device enclosure$_1$ 122 through device enclosure$_N$ 126.

Figure 2A:
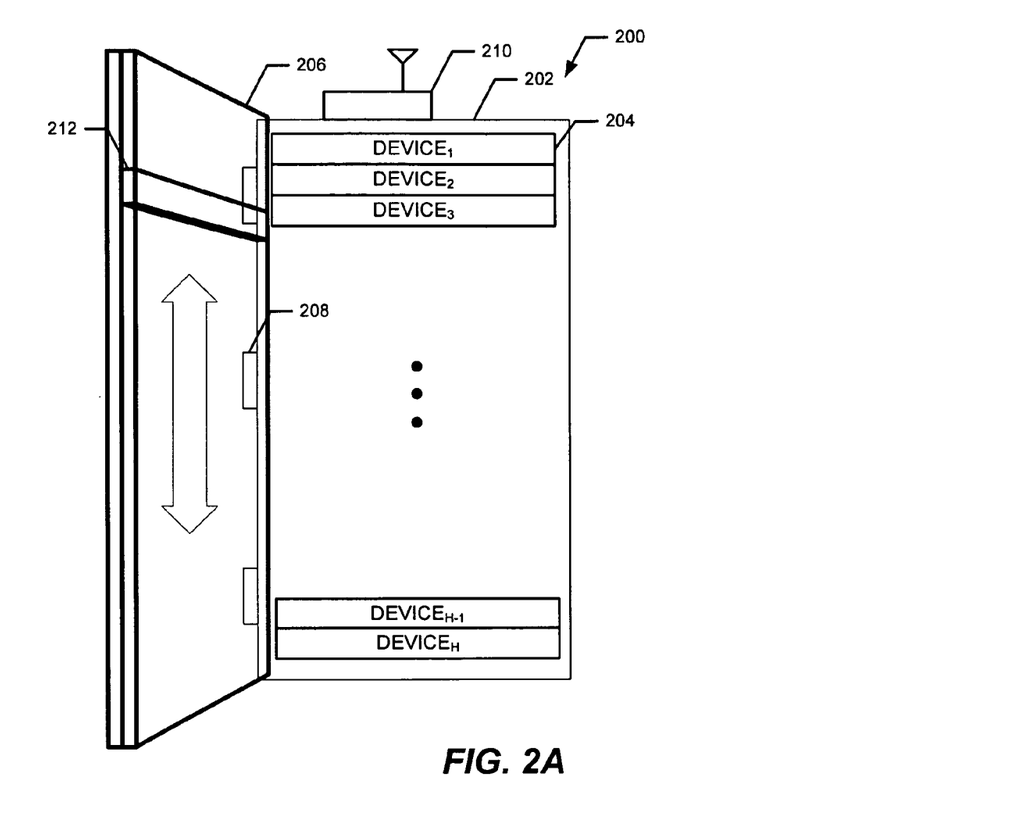
FIG. 2A depicts a schematic of an enclosure and devices designed in accordance with one implementation of the present invention.

FIG. 2A depicts a schematic of an enclosure and devices designed in accordance with implementations of the present invention. In this example, the enclosure is a rack 200 including a frame 202, device$_1$ 204 through device$_H$ 218, a door 206, hinges 208, locator component 210 and scanning bar 212. Frame 202 is designed to receive one or more of device$_1$ 204 through device$_H$ 218 within rack 200.

Rack 200 can be approximately 19 inches wide to receive a computer server, a storage attached network (SAN) device, a network attached storage device (NAS), a telecommunications modem, a power supply, a battery backup, a tape storage device, communications equipment and combinations thereof. Each of these devices can be measured in standard heights of one unit (1 U), two unit (2 U) or multiple n-units (nU) in height as well as non-standard heights measured in centimeters, inches or their equivalents. Locator component 210 for rack 200 can be a global positioning device (GPS) or WiFi device that identifies the geographic location of rack 200 in a physical locale.

Identification information associated with each device is exposed towards scanning bar 212 when door 206 is closed against frame 202. Hinges 208 keep door 206 properly aligned with frame 202 to ensure that scanning bar 212 can gather consistent images of device$_1$ 204 through device$_H$ 218 and corresponding identification information associated with each. In this example, scanning bar 212 is mounted to door 206 and moves up and down the height of door 206 as indicated.

To facilitate movement along door 206, scanning bar 212 can be propelled along a track using cables, belts or gears and a remotely coupled servo-motor located in rack 200. Alternatively, scanning bar 212 can be positioned using one or more servo-motors attached directly to scanning bar 212. The track for scanning bar 212 can be in the center of door 206, surface mounted on the inside of door 206 or otherwise attached to door 206 or a portion of door 206 to allow for images to be taken of device$_1$ 204 through device$_H$ 218. In either of these or other implementations, a general purpose computer or embedded control sends control signals to the servo-motors to control the specific movement of the scanning bar 212 and the capture and transmission of images.

It is also possible that door 206 has a separately hinged portion that also swings on hinges 208 designed specifically to house scanning bar 212. With this latter arrangement, door 206 can be opened while the portion holding scanning bar 212 remains positioned over device$_1$ 204 through device$_H$ 218. This would allow for the addition and removal of devices from frame 202 without disturbing scanning bar 212.

Figure 2B:
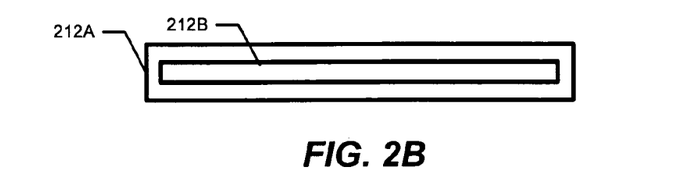
FIG. 2B depicts a linear scanner bar having a single imaging component along the width of the bar and useful in conjunction with one implementation of the present invention.

Many different types of scanning bar 212 can be used in conjunction with implementations of the present invention. A linear scanner bar 212A in FIG. 2B has a single imaging component along the width of the bar and therefore captures a contiguous image along the width or span of the bar. Images of the devices gathered as the linear scanner bar 212A moves along the height of an enclosure may be stitched together as certain images of the devices along the height may overlap or need interpolation to make a contiguous view. One or more light sources may also be located along the width of linear scanner bar 212A to enhance image capturing capabilities acuity of linear scanner bar 212A.

Figure 2C:
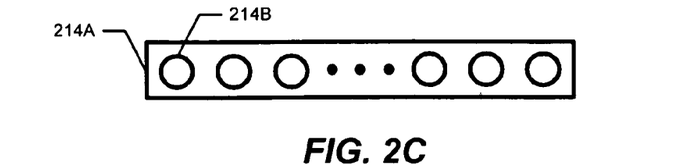
FIG. 2C depicts a camera array type of scanner bar having multiple imaging cameras along the width of the bar and also useful in conjunction with one implementation of the present invention.

A camera array scanner bar 214A in FIG. 2C can be used instead of linear scanner bar 212A. Instead of a single imaging component, multiple imaging cameras are placed in sequence along the horizontal axis to gather images of the devices in the enclosure. The width of rack 200 can determines how many imaging cameras are needed to capture the images along the width of the enclosure. This is advantageous as camera array scanner bar 214A can be customized for different width enclosures by using greater or fewer imaging cameras. Instead of making customized single imaging components, which may cost more money, the camera array scanner bar 214A can be assembled from a set of standard parts. To make a complete image of the devices, stitching is performed along the width of the images taken using camera array scanner bar 214A as well as along the height of the images taken as the camera array scanner bar 214A moves along the height of an enclosure. One or more light sources may also be located along the width of camera array scanner bar 214A to enhance its image capturing capabilities.

Figure 2D:
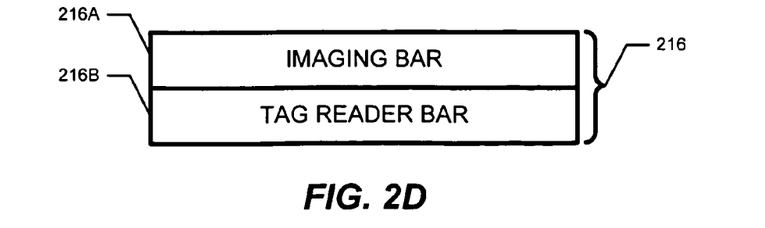
FIG. 2D depicts a composite scanner bar including both an imaging bar and a tag reader bar portion and useful in conjunction with one implementation of the present invention.

A composite scanner bar 216 depicted in FIG. 2D includes both an imaging bar 216A and a tag reader bar 216B. Both of these bars move together along the height of an enclosure gathering images and RFID (radio frequency identification) information associated with the underlying devices. For those devices having RFID tags, tag reader bar 216B portion of composite scanner bar 216 gathers detailed information provided through the associated tag for each device. Legacy devices without RFID tags are identified using images taken using the imaging bar 216A portion of composite scanner bar 216. Images taken by imaging bar 216A of devices having RFID tags can be used as backup information to corroborate the identity of a device and ensure the RFID tags are working properly or vice-versa. Of course, the images taken by imaging bar 216A can also be used as a backup for identification purposes in the event the RFID tag or tag reader bar 216B portion fails to operate correctly.

Figure 3:
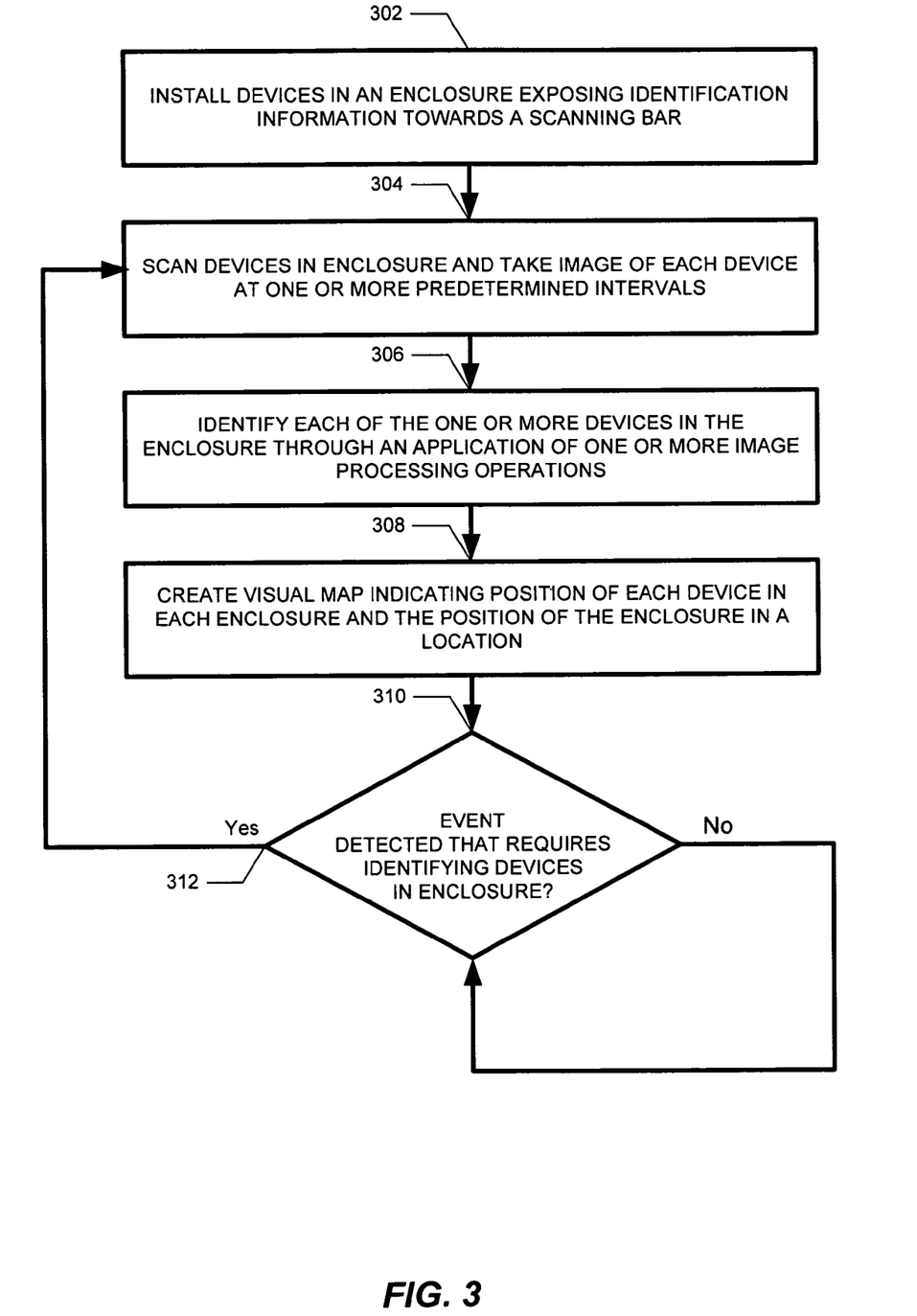
FIG. 3 is a flowchart diagram of the operations for identifying devices in an enclosure in accordance with one implementation of the present invention.

FIG. 3 is a flowchart diagram of the operations for identifying devices in an enclosure in accordance with implementations of the present invention. Initially, a device is installed in an enclosure exposing identification information towards a scanning bar (302). Typically, placing a cover plate or face plate of the device outward causes one or more pieces of identification information to be available to the scanning bar as it moves up and down across the enclosure. This identification information may include a manufacturing model, a bar code, a serial number, and various combinations of these or other pieces of information thereof. If a tag is part of the face plate or front portion of the device, RFID information may also be gathered more readily as a tag reader integrated into the scanning bar passes above the device.

At predetermined time intervals, implementations of the present invention scan devices in the enclosure and take images of each device (304). Images are taken of each device in the enclosure at different time intervals to provide a baseline for the contents of each rack. For example, an image can be taken of the devices in each rack in a large datacenter every 24 hours to ensure the images are not inconsistent with the rack contents. Staggering the images taken and transmitted throughout each 24 hour time period reduces contention for processing and network bandwidth compared with if the images are taken and transmitted in the same time interval.

Once the images are taken, implementations of the present invention identify each of the one or more devices through an application of one or more image processing operations (306). Image processing operations may be required to properly interpret the imaging information collected by the scanning bar. For example, these image processing operations may include optical character recognition (OCR), bar-code reading, pattern matching with previously taken database of device images and various combinations thereof. Stock images of the devices stored in a database can be compared with actual images gathered by the scanning bar to potentially identify the model, make or function of a particular device. These stock images can be purchased from the manufacturer of each device or taken with a camera as part of the intake inventory process when each of the devices are procured or purchased during a build out. In certain cases, subsequent processing of the images taken can optionally be bypassed if it is determined that the devices in the enclosure have not changed over time. For example, if implementations of the present invention determine that the newly gathered images are identical to the most recently taken images then devices in the enclosure have not changed and it is probably not necessary to process the images again.

Images collected are used to create a visual map indicating a position of each device in an enclosure and the position of the enclosure in a location (308). Implementations of the present invention can use actual images taken of the devices to construct an accurate visual representation of the devices in their enclosures. GPS or WiFi or other indoor positioning devices associated with the enclosure can be used to provide an accurate physical geographic position and location of the enclosure in the visual map. If for some reason it is necessary, the actual image of a device may instead be substituted with a stock image of the device as provided by the manufacturer. In both instances, a user can manipulate the visual map to help inventory devices, troubleshoot devices or more rapidly locate the devices in the event a device is suffering a partial or complete failure. For example, the visual map can searched to quickly identify a blinking light associated with a device experiencing a failure and then locate the location and specific enclosure holding the device.

Over time, there may be many events that require identifying the devices in the enclosure (312). As previously described, a predetermined time interval is one event that causes implementations of the present invention to repeat the identification of the devices in the one or many enclosures. For example, each rack in a datacenter can be scanned every 24 hours and new images gathered of the current devices in each rack. However, the occurrence of many other events may also require identifying the devices in one or more enclosures. For example, implementations of the present invention may also scan and identify devices in an enclosure when a device is added to the rack, a device is removed from the rack, a door to the rack is opened and closed or a power outage occurs.

Each of these events may require taking another inventory of the devices to maintain the integrity of the inventory database and not have duplicate or missing items.

Figure 4:
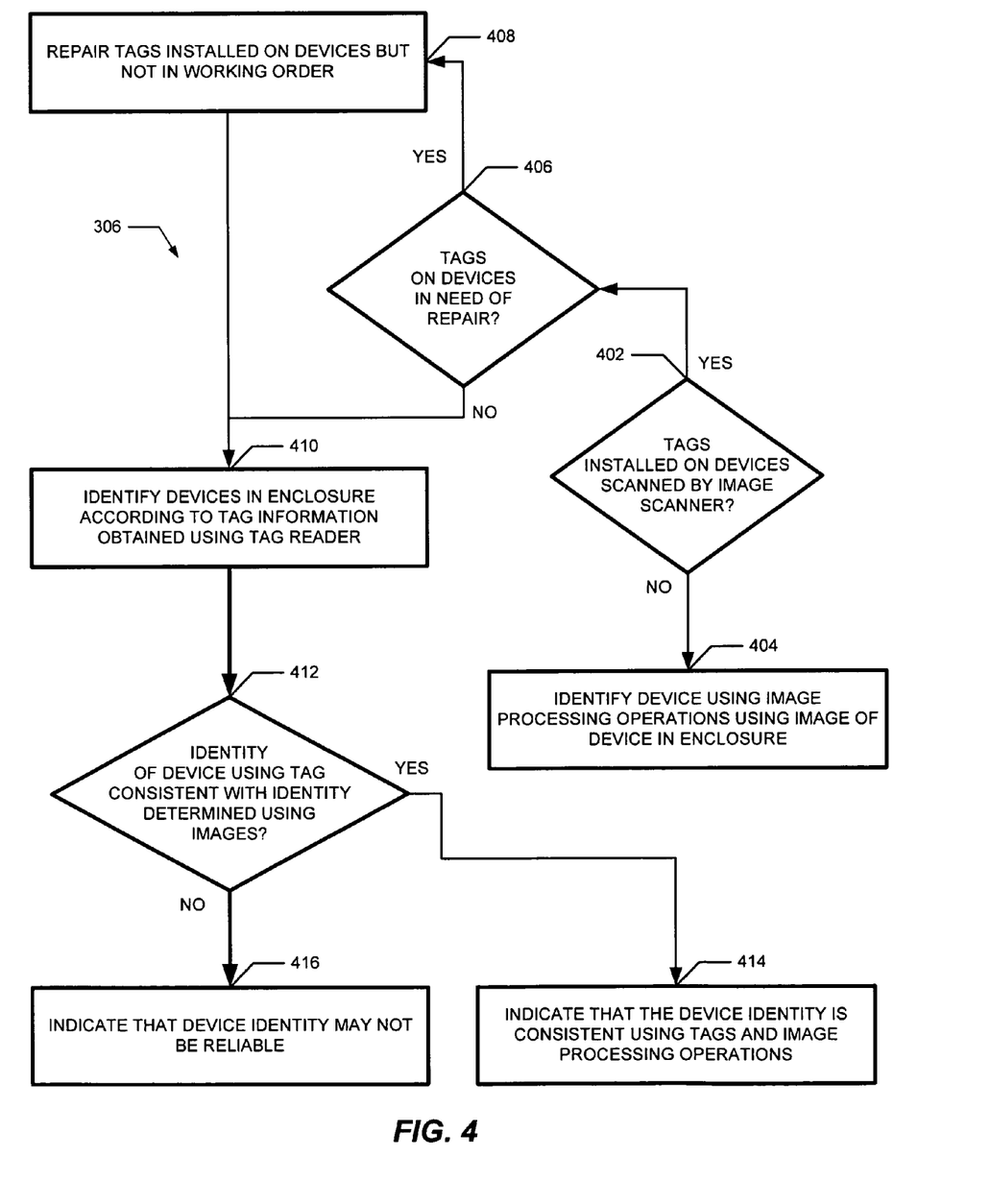
FIG. 4 is a flowchart of the operations used to complement the processing of images taken with information gathered using RFID and tag readers in accordance with one implementation of the present invention.

Implementations of the present invention can also use tag readers and RFID devices to supplement information gathered through images of the devices (306). FIG. 4 is a flowchart of the operations used to complement the processing of images taken with information gathered using RFID and tag readers. Implementations of the present invention initially determine if tags are installed on the devices scanned (402). The presence of a tag is generally determined by a tag reader or set of tag readers as described in conjunction with tag reader bar 216B of composite scanner bar 216 in FIG. 2. It is also possible to detect tags from an image of the devices scanned using imaging bar 216A of composite scanner bar 216. For example, the tag can be identified in an image of the device even if for some reason the tag is not operating properly. The tag can be detected through image processing operations applied to the image but not detectable by a tag reader or tag reader bar 216B of composite scanner bar 216. Additionally, historical database information on a device may indicate that a tag was present previously on the device and operating normally. A cross-correlation with the database would then be used to determine if the device actually has a tag and should have provided an RFID signal.

In any event, legacy devices not having tags are processed using only an image of the device in the enclosure (404) as previously described. Unlike the tag and reader, the image can unequivocally indicate if a device is present in the rack. In contrast, a tag or reader that is not operatingly properly may falsely indicate that a device having a tag is not present in a position of the rack.

Next, a tag on the device may be in need of repair or replacement (406). A repair request is sent to first repair tags known to be installed on one or more devices but not in working order. (408). For example, the circuitry of a tag may have failed and need repair, a battery may have failed (in the case of an active tag) or there may be something interfering with the tags operation that needs correction.

If a device has an operating tag, implementations of the present invention use the tag information gathered by a tag reader to identify the one or more devices in the enclosure (410). For example, the information provided for by the tag for a device may include a serial number, a model number, capacity, throughput and other technical information concerning operation of the device. Next, a comparison is made between the identification information provided by the tag for the device and the identification information determined using the image of the device (412). If the identification information provided using the tag and the image are not in conflict, an indication is provided that the tag and image processing operations for device identification are consistent and reliable (414).

Alternatively, an indication is provided that the device identification information from the tag and image processing operations may not be reliable (416) when the information from the tags and image are not consistent. In one implementation, manually verifying the identity and location of the device may be required to be certain the information is correct and reliable. Alternatively, implementations of the present invention may use either the identification information derived from either the image or from the RFID tag depending on which is deemed to be more likely to be correct and reliable under the circumstances. For example, a user can visually verify a device by bringing up an image of the device on a display device and entering specific information concerning the device based on the user's ability to recognize the faceplate, color, or other unique identification information associated with the particular device and appearance in the image.

Figure 5:
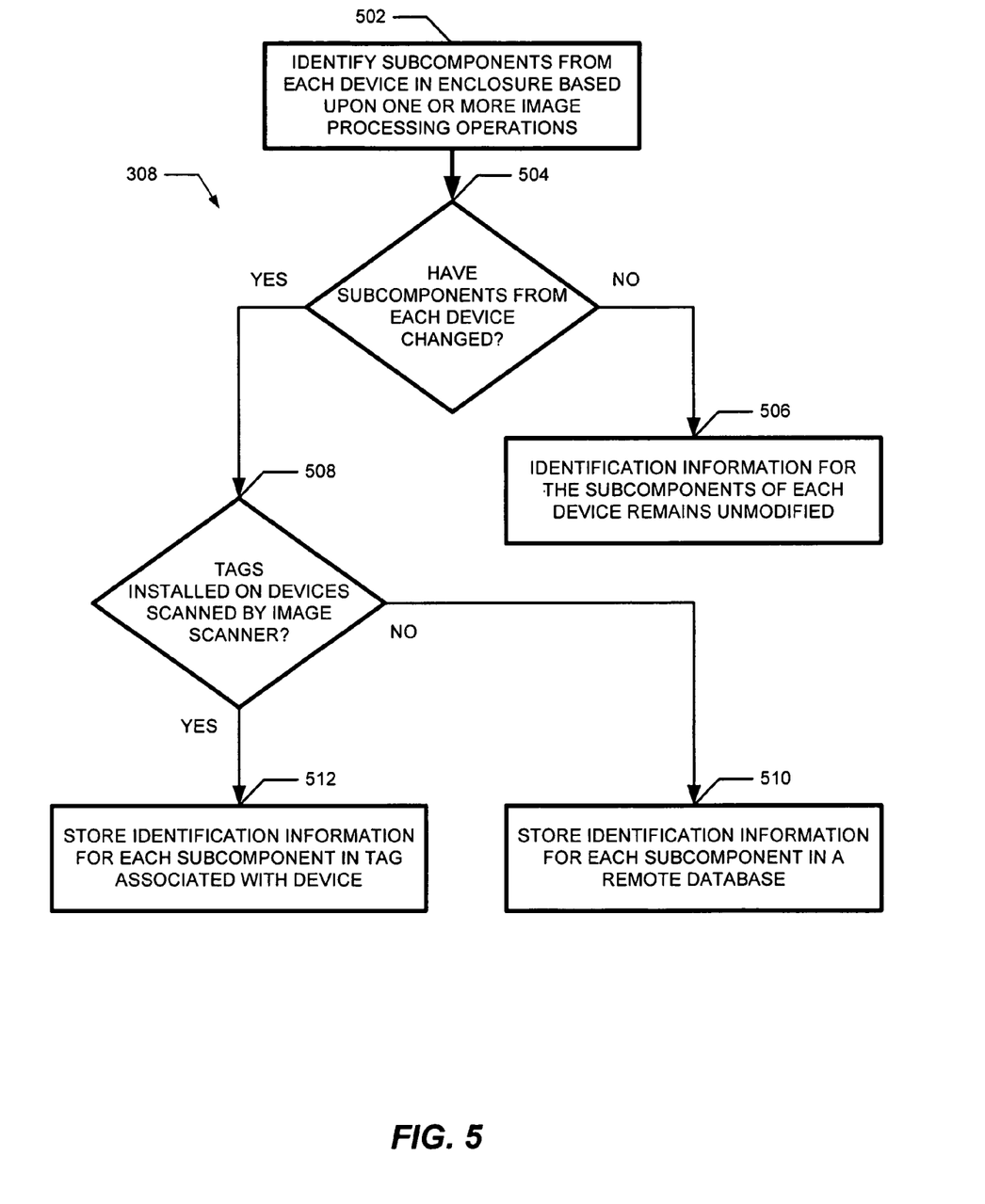
FIG. 5 is a flowchart of the processing operations to store device and subcomponent information in the RFID tags of the devices in accordance with one implementation of the present invention.

FIG. 5 is a flowchart of the operations to store device and subcomponent information in the RFID tags of the devices in accordance with one implementation of the present invention. Implementations of the present invention identify subcomponents from each device through one or more image processing operations (502). For example, scanning an image of a device for bar code labels associated with hard-drives, tape drives and other subcomponents can identify the various subcomponents loaded into a computer or other device.

A database is referenced to then determine if the subcomponents from each device have changed (504). If the subcomponents are the same then the identification information describing the subcomponents for each device remains unmodified (506).

Figure 6:
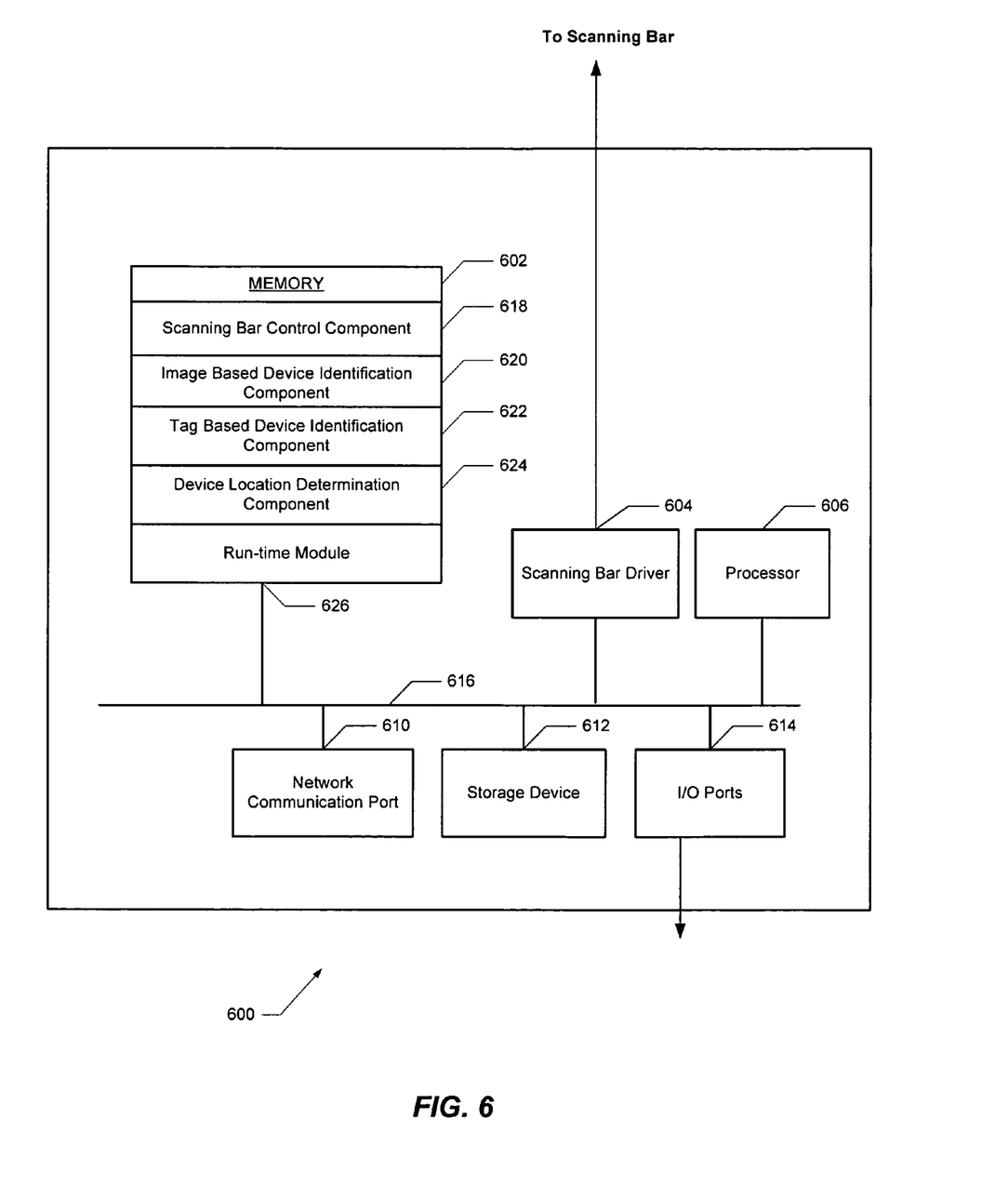
FIG. 6 is a schematic diagram of a scanning system and logic used to identify devices in accordance with one implementation of the present invention.

However, if the subcomponents identified are different then the identification information describing the subcomponents needs to be modified or changed and stored for future reference. If tags are installed on the devices (508) then the identification information for each subcomponent is stored or written into the tag associated with the device (512). Alternatively, if there is no tag then the identification information for each subcomponent of the device is stored in a remote database. The identification information helps keep track of the device as well as the subcomponents in each device as it may change over time. FIG. 6 is a schematic diagram of a scanning system 600 (hereinafter system 600) and logic used to identify devices in accordance with one implementation of the present invention. System 600 includes a memory 602 to hold executing components or programs (typically random access memory (RAM) or read-only memory (ROM) such as a flash RAM), a scanning bar driver 604, a processor 606, a network communication port 610 for data communication, a storage device 612, and input/output (I/O) ports 614 with integrated I/O controller operatively coupled together over an interconnect 616. System 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In one implementation, memory 602 includes scanning bar control component 618, image based device identification component 620, tag based device identification component 622, device location determination component 624 and runtime module 624 that manages the resources associated with system 600. In operation, scanning bar control component 618 responds to various events and instructions one or more scanning bars to scan the contents of an enclosure for devices. Scanning bar driver 604 converts instructions to scan into low level commands or signals that one or many different scanning bars would recognize. For example, scanning bar control component may maintain a database of enclosures and the corresponding types of events that require a scanning bar to scan and update the contents of the enclosure. Each scanning bar may have slightly different commands or instructions to make them operate properly.

Image based identification component 620 processes the image information gathered by a scanning bar using various image processing operations. As previously described, these image processing operations may include: optical character recognition (OCR), bar-code reading, pattern matching with previously taken database of device images and various combinations thereof. The image information can also be used to provide a visual representation of each device in a visual map of the devices in their enclosures and various locations.

Tag based device identification component 622 performs various operations involving tag readers, tags and the information provided by devices having tags upon operating the tag readers. If a device has a tag then tag based device identification component 622 obtains the tag information and generates detailed information about the device including, for example, a model, a manufacture date, a manufacturer, a serial number and various other particular pieces of information. This information is used in conjunction with the image information taken and processed previously to more precisely and accurately identify the various devices. Generally, if the information provided by the tags is inconsistent with the information provided through the image processing then the identification of the device may need to be confirmed manually or through additional steps.

Device location determination component 624 processes image information, tag information as well as location information associated with the enclosures to locate each device. In some implementations, location information of each enclosure is entered in manually as the enclosures are positioned in a datacenter or other locations. However, a GPS transceiver or other location device mounted on the enclosure or rack can be useful in dynamically determining the location of each enclosure with a longitude and latitude reference. Cross-referencing the location of each enclosure with the devices contained within the enclosure greatly facilitates quick troubleshooting and locating devices with minimum effort.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A computer implemented method of tracking devices, comprising:
   receiving identification information associated with a device in an enclosure with identification information associated with the device exposed towards a scanning bar;
   scanning with the scanning bar for an actual image of each of the one or more devices in the enclosure at one or more predetermined intervals;
   identifying each of the one or more devices in the enclosure through an application of one or more image processing operations on the actual image of each of the one or more devices; and
   creating a visual map of the one or more devices depicting an accurate visual representation of each device and its respective location in the enclosure.

2. The method of claim 1 further comprising:
   receiving one or more stock images corresponding to the one or more devices in the enclosure; and
   replacing the actual images of the one or more devices with the one or more stock images corresponding to the one or more devices in the enclosure in the visual map.

3. The computer implemented method of claim 1 further comprising:
   determining if an event requires an updated identification of the one or more devices in the enclosure; and
   repeating the scanning, identifying and creating operations when the determination indicates that the event requires updating the identification.

4. The computer implemented method of claim 3 wherein the event that requires the updated identification is selected from a set of events including: a device is added to the enclosure, a device is removed from the enclosure, a door to the enclosure is opened and closed, a power outage and a predetermined time interval has elapsed.

5. The computer implemented method of claim 1 wherein the identification information associated with the device includes one or more identifiers selected from a set of identifiers including: a manufacturing model, a bar code, a serial number, and combinations thereof.

6. The computer implemented method of claim 1 wherein the scanning bar is selected from a set of scanning bars including: a linear scanning bar, a camera array scanning bar and combinations thereof.

7. The computer implemented method of claim 1 wherein the devices in the enclosure are selected from a set of devices including: a computer server, a storage attached network (SAN) device, a network attached storage device (NAS), a telecommunications modem, a power supply, a battery backup, a tape storage device, communications equipment and combinations thereof.

8. The computer implemented method of claim 1 wherein the one or more image processing operations includes: optical character recognition (OCR), bar-code reading, pattern matching and combinations thereof.

9. The computer implemented method of claim 8 wherein the pattern matching further includes:
   receiving one or more stock images corresponding to the one or more potential devices in the enclosure; and comparing the one or more stock images with the actual image of each of the one or more devices.

10. The computer implemented method of claim 1 wherein the visual map further is based upon position information selected from a set including a Global Positioning Satellite (GPS), a WiFi device, indoor positioning devices associated with the enclosure and other positioning systems using Satellite technology.

11. The computer implemented method of claim 1 wherein the identifying further comprises:
   determining if one or more devices have tags capable of being detected by a tag reader;
   identifying the one or more devices in the enclosure on the basis of an image when the determination indicates no tags are installed onto the device;
   identifying the one or more devices in the enclosure on the basis of information from an RFID (radio-frequency identification) tag;
   comparing the identification of the devices using the image compared with the identification of the devices using the tags and the tag reader; and
   selecting an identification of the device based upon a consistency of information provided between the image of the device and the tag of the device.

12. A system for tracking devices, comprising:
   an enclosure for receiving one or more devices positioned to expose identification information related to each device;
   a scanning bar movably coupled to the enclosure that passes over each of the one or more devices to capture an actual image of each of the one or more devices and the identification information exposed by each of the one or more devices;
   a processor for processing instructions; and
   a memory for holding instructions when executed on the processor that receives each of the one or more actual images and identifies each of the one or more devices in the enclosure using image processing operations and for holding instructions when executed by the processor that generates a visual map for display on a display device of the one or more devices depicting an accurate visual representation of each device and its respective location in the enclosure.

13. The system of claim 12 further comprising instructions when executed in the memory that cause the processor to receive one or more stock images corresponding to the one or more devices in the enclosure and to replace the actual images of the one or more devices with the one or more stock images corresponding to the one or more devices in the enclosure in the visual map.

14. A computer program product, tangibly stored on a computer readable medium, for tracking the location of devices, comprising instructions operable to cause a programmable processor to:
   receive identification information associated with a device in an enclosure with identification information associated with the device exposed towards a scanning bar;
   scan with the scanning bar for an actual image of each of the one or more devices in the enclosure at one or more predetermined intervals;
   identify each of the one or more devices in the enclosure through an application of one or more image processing operations on the actual image of each of the one or more devices; and
   create a visual map of the one or more devices depicting an accurate visual representation of each device and its respective location in the enclosure.

15. The computer program product of claim 14 further comprising instructions that:
   receive one or more stock images corresponding to the one or more devices in the enclosure; and
   replace the actual images of the one or more devices with the one or more stock images corresponding to the one or more devices in the enclosure in the visual map.

16. The computer program product of claim 14 further comprising instructions that:
   determine if an event requires an updated identification of the one or more devices in the enclosure; and
   repeat the scanning, identifying and creating operations when the determination indicates that the event requires updating the identification.

17. The computer program product of claim 16 wherein the event that requires the updated identification is selected from a set of events including: a device is added to the enclosure, a device is removed from the enclosure, a door to the enclosure is opened and closed, a power outage and a predetermined time interval has elapsed.

18. The computer program product of claim 14 wherein the identification information associated with the device includes one or more identifiers selected from a set of identifiers including: a manufacturing model, a bar code, a serial number, and combinations thereof.

19. An apparatus for tracking devices, comprising:
   means for receiving identification information associated with a device in an enclosure with identification information associated with the device exposed towards a scanning bar;
   means for scanning with the scanning bar for an actual image of each of the one or more devices in the enclosure at one or more predetermined intervals
   means for identifying each of the one or more devices in the enclosure through an application of one or more image processing operations on the actual image of each of the one or more devices; and
   means for creating a visual map of the one or more devices depicting an accurate visual representation of each device and its respective location in the enclosure.

20. The apparatus of claim 19 further comprising:
   means for receiving one or more stock images corresponding to the one or more devices in the enclosure; and
   means for replacing the actual images of the one or more devices with the one or more stock images corresponding to the one or more devices in the enclosure in the visual map.

* * * * *